US009160071B2

(12) United States Patent
Kenington

(10) Patent No.: US 9,160,071 B2
(45) Date of Patent: Oct. 13, 2015

(54) ACTIVE ANTENNA FOR FILTERING RADIO SIGNAL IN TWO FREQUENCY BANDS

(75) Inventor: Peter Kenington, Chepstow (GB)

(73) Assignee: KATHREIN-WERKE KG, Rosenheim (DE)

( * ) Notice: Subject to any disclaimer, the term of this patent is extended or adjusted under 35 U.S.C. 154(b) by 680 days.

(21) Appl. No.: 12/973,160

(22) Filed: Dec. 20, 2010

(65) Prior Publication Data

US 2012/0157023 A1 Jun. 21, 2012

(51) Int. Cl.

*H04B 1/38* (2015.01)
*H01Q 3/26* (2006.01)
*H04M 1/00* (2006.01)

(52) U.S. Cl.

CPC .................................... *H01Q 3/26* (2013.01)

(58) Field of Classification Search

USPC ........ 455/103, 129, 561, 562.1; 343/853, 858
See application file for complete search history.

(56) References Cited

U.S. PATENT DOCUMENTS

| | | | | |
|---|---|---|---|---|
| 4,288,875 | A * | 9/1981 | Carter | 455/195.1 |
| 5,206,655 | A * | 4/1993 | Caille et al. | 343/700 MS |
| 5,915,213 | A * | 6/1999 | Iwatsuki et al. | 455/116 |
| 6,400,237 | B1 * | 6/2002 | Seino | 333/156 |
| 6,640,110 | B1 * | 10/2003 | Shapira et al. | 455/562.1 |
| 6,710,742 | B1 * | 3/2004 | Meredith | 342/373 |
| 2004/0192394 | A1 * | 9/2004 | Nakaya et al. | 455/562.1 |
| 2008/0102760 | A1 * | 5/2008 | McConnell et al. | 455/73 |
| 2008/0111607 | A1 * | 5/2008 | Hart | 327/255 |
| 2008/0180190 | A1 * | 7/2008 | Chan et al. | 333/118 |
| 2010/0330940 | A1 * | 12/2010 | Sheynblat et al. | 455/129 |

* cited by examiner

*Primary Examiner* — Lee Nguyen

(74) *Attorney, Agent, or Firm* — Stephen H. Eland; Dann, Dorfman, Herrell & Skillman

(57) ABSTRACT

An active antenna system comprises a coupling block adapted to sample a portion of a first telecommunication signal and a compensation block. The compensation block is coupled to the coupling block and is adapted to apply at least a phase compensation to the portion of the first telecommunication signal, thereby obtaining a first compensation signal. The coupling block is further adapted to combine the first telecommunication signal and the first compensation signal into a compensated first telecommunications signal to be fed into an antenna arrangement.

11 Claims, 5 Drawing Sheets

ACTIVE ANTENNA FOR FILTERING RADIO SIGNAL IN TWO FREQUENCY BANDS

CROSS-REFERENCE TO RELATED APPLICATIONS

The present application is related to U.S. patent application Ser. No. 12/973,276 entitled Active Antenna System and Method for Combining Signals, filed Dec. 20, 2010. The entire disclosure of the foregoing application is incorporated herein by reference.

FIELD OF THE INVENTION

The field of the invention relates to an active antenna system.

BACKGROUND OF THE INVENTION

The use of mobile communications networks has increased over the last decade. Operators of the mobile communications networks have increased the number of base stations in order to meet an increased demand for service by users of the mobile communications networks. The operators of the mobile communications network wish to reduce the running costs of the base station. One option to do this is to implement a radio system as an antenna-embedded radio forming an active antenna array. Many of the components of the antenna-embedded radio may be implemented on one or more chips.

Nowadays active antenna arrays are used in the field of mobile communications systems in order to reduce power transmitted to a handset of a customer and thereby increase the efficiency of the base transceiver station i.e. the radio station. The radio station typically comprises a plurality of antenna elements, i.e. an antenna array adapted for transceiving a payload signal. Typically the radio station comprises a plurality of transmit paths and receive paths. Each of the transmit paths and receive paths are terminated by one of the antenna elements. The plurality of the antenna elements used in the radio station typically allows steering of a beam transmitted by the antenna array. The steering of the beam includes but is not limited to at least one of: detection of direction of arrival (DOA), beam forming, down tilting and beam diversity. These techniques of beam steering are well-known in the art.

The active antenna array or active antenna system is typically mounted on a mast or tower. The active antenna array is coupled to the base transceiver station (BTS) by means of a fibre optics cable and a power cable. The base transceiver station is coupled to a fixed line telecommunications network operated by one or more operators.

Equipment at the base of the mast as well as the active antenna array mounted on the mast is configured to transmit and receive radio signals within limits set by communication standards.

The code sharing and time division strategies as well as the beam steering rely on the radio station and the active antenna array to transmit and receive within limits set by communication standards. The communications standards typically provide a plurality of channels or frequency bands useable for an uplink communication from the handset to the radio station as well as for a downlink communication from the radio station to the subscriber device.

For example, the communication standard "Global System for Mobile Communications (GSM)" for mobile communications uses different frequencies in different regions. In North America, GSM operates on the primary mobile communication bands 850 MHz and 1900 MHz. In Europe, Middle East and Asia most of the providers use 900 MHz and 1800 MHz bands.

As technology evolves, the operators have expressed a desire for an active antenna array which is able to utilise the existing base-station investments, in addition to providing a new system/band. For example, in the roll-out of long term evolution (LTE) at 700 MHz (US) or 800 MHz (EU), the operators would like to deploy a single antenna at the masthead which could transmit the existing 900 MHz (EU) or 850 MHz (US) GSM signals, using equipment at the base of the mast, as well as providing active antenna functionality for the new LTE installation.

One solution comprises using a dual-band or broadband passive antenna, with two traditional base transceiver stations at the foot of the mast. For example, the dual-band or broadband passive antenna would form part of a traditional base transceiver station. This solution however would suffer various drawbacks. Having a dual band or broadband passive antenna would not allow the two frequency bands to have independent downtilt angles. Both bands would need to share the same downtilt and this would be sub-optimal for either one or both of the frequency bands, depending upon the tilt angle chosen.

There are a number of options for allowing the combination of both existing radio signals in a first frequency band, hereafter referred to as the passive signal, emanating from or travelling to a base transceiver station or remote radio head at the bottom of a mast with radio signals, hereafter referred to as the active signal, from a different band, generated (or received) within the active electronics of an active antenna system (see co-pending application . . . ).

All of these options, however, rely upon some form of filtering of the first signals in the first frequency band, prior to combination with the second signals in the second frequency band. The filtering uses bandpass filters, which typically need to be high performance in terms of their roll-off characteristics. It is difficult to manufacture identically performing filters, particularly from a phase/group-delay perspective.

Small differences in the phase or group delay characteristics of the bandpass filters may impact on the beam-shape, tilt angle and/or sidelobe suppression characteristics of the active antenna array.

One option could be to perform some form of trimming of the bandpass filters upon manufacture. Such trimming for low-power filter technologies is however difficult and expensive and is currently unable to yield the accuracy required (which is typically a phase matching accuracy of few degrees).

It would be desirable to enable some form of phase compensation to take place in the active antenna array itself, at high power, to compensate for any errors, however introduced, on the passive signals.

SUMMARY OF THE INVENTION

The present disclosure teaches an active antenna system, comprising: a coupling block adapted to sample a portion of a first telecommunication signal, a compensation block coupled to the coupling block, the compensation block being adapted to apply at least a phase compensation to the portion of the first telecommunication signal and thereby obtaining a first compensation signal, the coupling block being further adapted to combine the first telecommunication signal and the first compensation signal into a compensated first telecommunications signal for feeding into an antenna arrangement.

In one aspect of the disclosure, the portion of the first telecommunication signal represents between 5 and 50% of the first telecommunication signal.

In another aspect of the disclosure, the coupling block comprises a summing junction, and a first resistance is coupled between the summing junction and the compensation block.

In yet another aspect of the disclosure, the compensation block comprises at least one varactor diode controlled by a control voltage supplied through an RF choke.

The compensation block may comprise an array of varactor diodes controlled by a control voltage supplied through an RF choke.

In one aspect of the disclosure, the compensation block comprises a vector modulator adapted to apply at least one of a phase compensation and an amplitude compensation to the portion of the first telecommunication signal.

In yet another aspect of the disclosure, the compensation block comprises at least one switch coupled to at least one fixed transmission line length.

The at least one switch may comprise a pin diode controlled by a control voltage supplied through a RF choke.

In one aspect of the disclosure, the system comprises a first coupling block with a first filter coupled to a first compensation block, wherein the first filter is adapted for filtering transmit signals of the first telecommunication signal, and a second coupling block with a second filter coupled to a second compensation block, wherein the second filter is adapted for filtering receive signals of the first telecommunication signal.

The system in yet another aspect of the disclosure comprises a bandpass filter adapted to filter the first telecommunication signals in a first frequency band, wherein the first telecommunication signals are radiated in a first antenna section, and a combining element adapted for combining the compensated first telecommunications signal and a second telecommunication signal in a second frequency band into a combined telecommunications signal for feeding into the antenna arrangement.

In one aspect of the disclosure, the system further comprises a splitting element adapted to split a combined telecommunications signal from the antenna arrangement into first receive signals of the first telecommunication signal in a first frequency band and second receive signals of the second telecommunication signal in a second frequency band, a second coupling block with a second filter coupled to a second compensation block, wherein the second coupling block is adapted to filter a portion of the first receive signals, and the second compensation block is adapted to apply at least a phase compensation to the portion of the first receive signals, thereby obtaining a first receive compensation signal, the second coupling block being further adapted to combine the first receive signals and the first receive compensation signal into a first compensated received telecommunications signal, and a bandpass filter adapted to filter the first compensated received telecommunication signal on passage of the first received signals to a first antenna section.

The present disclosure also teaches a computer program product comprising a non-transitory computer-usable medium having control logic stored therein for causing a computer to manufacture an active antenna system comprising: a coupling block adapted to sample a portion of a first telecommunication signals, a compensation block coupled to the coupling block, the compensation block being adapted to apply at least a phase compensation to the portion of the first telecommunication signal thereby obtaining a first compensation signal, and the coupling block being further adapted to combine the first telecommunication signal and the first compensation signal into a compensated first telecommunications signal to be fed into an antenna arrangement.

DETAILED DESCRIPTION OF THE INVENTION

The invention will now be described on the basis of the drawings. It will be understood that the embodiments and aspects of the invention described herein are only examples and do not limit the protective scope of the claims in any way. The invention is defined by the claims and their equivalents. It will be understood that features of one aspect or embodiment of the invention can be combined with a feature of a different aspect or aspects and/or embodiments of the invention.

The term "base transceiver station (BTS)" in the context of this disclosure includes, but is not limited to, base stations, as known from GSM networks, as well as a node B (known from UMTS/3G networks) or enhanced node B, and similar units used in other mobile communication network.

The term "subscriber device" in the context of this disclosure is intended to encompass all types of mobile stations and other devices connected to the mobile communication network. Such subscriber devices can be portable or stationary. For example wireless modules can be incorporated into vending machines for the transceiving of data over the mobile communication network. Such wireless modules are also considered to be subscriber devices.

Figure 1:
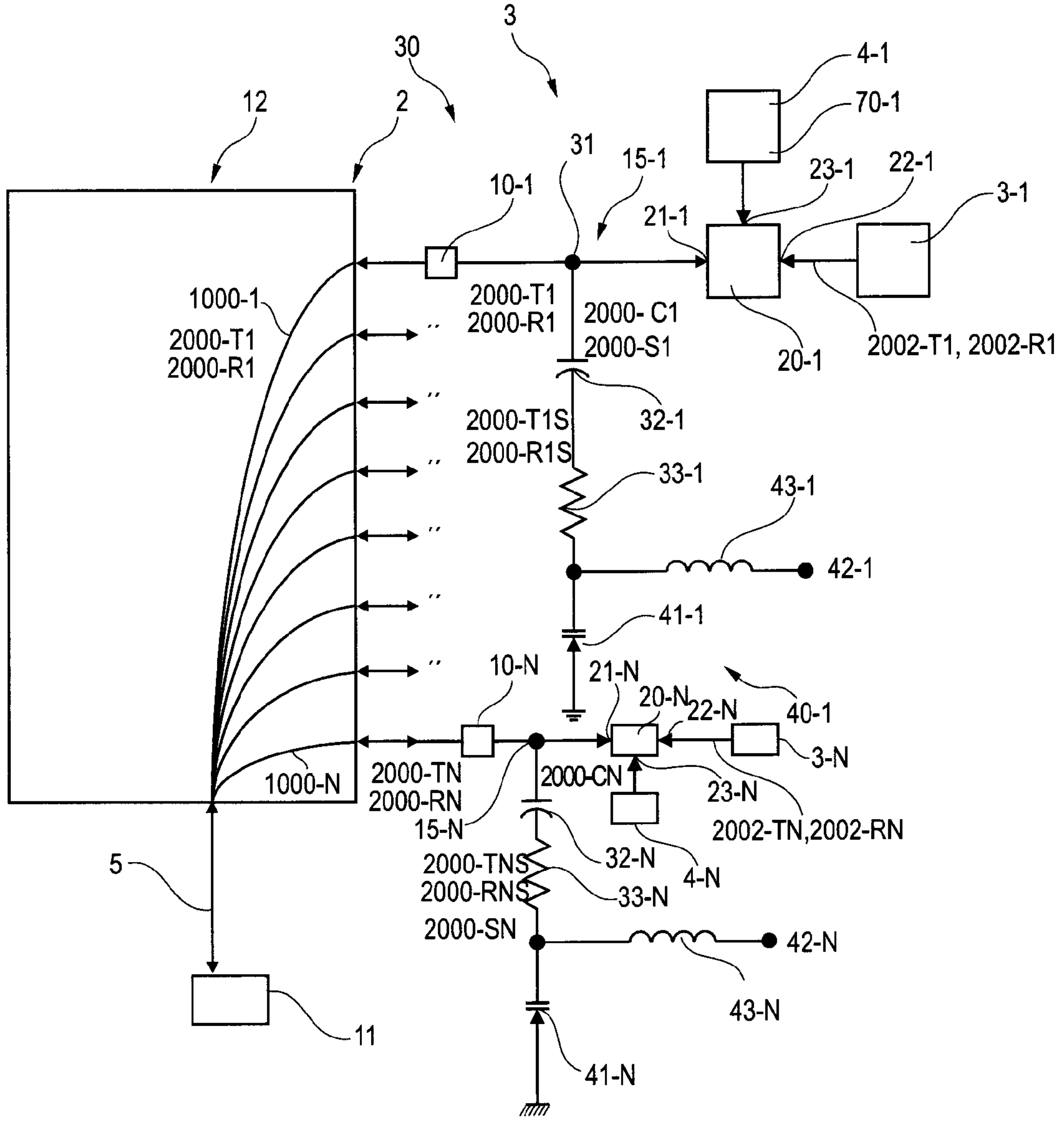
FIG. 1 shows a combined single band active and broadband passive antenna system comprising an active antenna system according to one aspect of the disclosure.

FIG. 1 shows a combined single band active and broadband passive antenna system 1 comprising an active antenna system according to one aspect of the disclosure.

The single band active and broadband passive antenna system 1 comprises two antenna sections: a first antenna section 2, hereafter referred to as the passive antenna section 2, and a second antenna section 3 hereafter referred to as the active antenna section 3.

The passive antenna section 2 is adapted to transmit and receive first telecommunications signals to and from a base transceiver station 11 in a first frequency band. The passive antenna section 2 typically corresponds to existing installations, comprising the base transceiver station 11 and a corporate feed network 12.

The passive antenna section 2 may be designed to transmit telecommunications signals on a first transmit band TB1 and to receive telecommunications signal on a first receive band RB1, as defined by telecommunication standards. The passive antenna section 2 as exemplified in the present disclosure is designed to transceive GSM signals in the band of 900 MHz in Europe. The first transmit band TB1 comprises frequencies preferably between 925 MHz and 960 MHz. The first receive band RB1 comprises frequencies preferably between 880 MHz and 915 MHz. However these frequencies are not limiting of the invention and any other telecommunication bands could be contemplated.

The active antenna section 3 comprises an active transceiver arrangement 3-1, . . . , 3-N and an antenna element arrangement 4-1, . . . , 4-N. The active antenna section 3 provides active antenna capabilities via the antenna element arrangement 4-1, . . . , 4-N. The active antenna section 3 is also adapted for transceiving radio signals generated (or received) within the active electronics of the active transceiver arrangement 3-1, . . . , 3-N of the active antenna section 3.

The active transceiver arrangement 3-1, . . . , 3-N is adapted to generate radio signals on a second, different transmit band TB2 and to receive radio signals on a second, different receive band RB2. For example, the active transceiver arrangement 3-1, . . . , 3-N may be designed to transceive LTE signals in the band of 800 MHz in Europe. The second transmit band TB2 comprises frequencies preferably between 790 MHz and 821 MHz. The second receive band RB2 comprises frequencies preferably between 832 MHz and 862 MHz. However this is not limiting the invention and any other telecommunication bands could be contemplated.

The antenna element arrangement 4-1, . . . , 4-N is adapted to radiate radio signals in the first transmit band TB1 fed from the passive antenna section 2 and radio signals in the second transmit band TB2 fed from the active transceiver arrangement 3-1, . . . , 3-N. The antenna element arrangement 4-1, . . . , 4-N is further adapted to collect radio signals in the first receive band RB1 to be fed to the passive antenna section 2 and radio signals in the second receive band RB2 to be fed to the active transceiver arrangement 3-1, . . . , 3-N.

The present disclosure is described with single transmit bands and single receive bands. However, this is not limiting of the invention and the passive antenna section 2 and/or the active transceiver arrangement 3-1, . . . , 3-N may be multiband systems, adapted to transceive radio signals covering more than one telecommunication band according to the telecommunications standards.

The passive antenna section 2 is connected to the base transceiver station 11 by means of a coaxial feeder cable 5. The coaxial feeder cable 5 is adapted to carry telecommunication signals at radio frequencies to and from the base transceiver station 11.

The passive antenna section 2 comprises transmit-receive paths 1000-1, . . . , 1000-N. There are eight different transmit-receive paths 1000-1, . . . , 1000-N shown within FIG. 1. It will however be appreciated by the person skilled in the art that the number of transmit-receive paths 1000-1, . . . , 1000-N can be changed and is not limiting of the invention. In a typical implementation there will be eight or sixteen transmit-receive paths.

The transmit-receive paths 1000-1, . . . , 1000-N are adapted to carry the transmit signals and the receive signals between the antenna element part 30 and coaxial feeder cable 5 leading to the base transceiver station 11.

The transmit-receive path 1000-1, . . . , 1000-N is designed to carry a first transmit signal 2000-T1, . . . , 2000-TN and a first receive signal 2000-R1, . . . , 2000-RN.

The first transmit signal 2000-T1, . . . , 2000-TN comprises radio signals of frequencies in a first transmit band frequency TB1. The first receive signal 2000-R1, . . . , 2000-RN comprises signals of frequencies in a first receive frequency band RB1.

Each one of the transmit-receive paths 1000-1, 1000-N is terminated by an output to the active antenna section 3. As can be seen in FIG. 1, each one of the transmit-receive paths 1000-1, 1000-N is coupled to a bandpass filter 10-1, . . . , 10-N. The bandpass filter 10-1, . . . , 10-N allows passage of the radio signal at frequencies in both the receive frequency band RB1 and the transmit frequency band TB1 of the passive antenna section 2. The bandpass filter 10-1, . . . , 10-N is a broadband filter covering the whole frequency band, including both transmission frequencies and receive frequencies.

The output of the filter 10-1, . . . , 10-N is coupled to a sampling element 15-1, . . . , 15-N followed by a combining element 20-1, . . . , 20-N.

The sampling element 15-1, . . . , 15-N is adapted to extract a sampling signal 2000-S1, . . . , 2000-SN out of the transmit signal 2000-T1, 2000-TN. The sampling element 15-1, . . . , 15-N is coupled to a compensation block 40-1, . . . , 40-N.

The compensation block 40-1, . . . , 40-N is aimed at providing at least phase compensation for the first telecommunication signals, as will be described in detail later.

The sampling element 15-1, . . . , 15-N is coupled to a first port 21-1, . . . , 21-N of the combining element 20-1, . . . , 20-N. The combining element 20-1, . . . , 20-N is adapted to combine the radio signals in both of the two transmit frequency bands TB1, TB2. The combining element 20-1, . . . , 20-N is adapted to split the radio signals in both of the receive frequency bands RB1, RB2.

The combining element 20-1, . . . , 20-N may be a circulator or a summing junction, or any other element adapted to combine or split the radio signals with reduced power loss.

The port 21-1, . . . , 21-N is adapted for feeding the first transmit signals 2000-T1, . . . , 2000-TN to be fed to the antenna element arrangement 4-1, . . . , 4-N into the combiner 20-1, . . . , 20-N. Similarly the port 21-1, . . . , 21-N is adapted for feeding the first receive signals 2000-R1, . . . , 2000-RN from the antenna element arrangement 4-1, . . . , 4-N into the passive antenna section 2.

The combining element 20-1, . . . , 20-N comprises a second port 22-1, . . . , 22-coupled to the active transceiver arrangement 3-1, . . . , 3-N. The combining element 20-1, . . . , 20-N comprises a third port 23-1, . . . , 23-N coupled to the antenna element arrangement 4-1, . . . , 4-N.

The active transceiver arrangement 3-1, . . . , 3-N is adapted to add a new band signal to the already existing receive frequency band RB1 and the transmit frequency band TB1 already installed on the passive antenna section 2. The active transceiver arrangement 3-1, . . . , 3-N is therefore adapted to process a second transmit signal 2002-T1, . . . , 2002-TN in a second transmit frequency band TB2 and a second receive signal 2002-R1, . . . , 2002-RN in a second receive frequency band RB2.

The second transmit signal 2002-T1, . . . , 2002-TN comprises the radio signals of frequencies in the second transmit frequency band TB2. The second receive signal 2002-R1, . . . , 2002-RN comprises signals of frequencies in the second receive frequency band RB2.

The active transceiver arrangement 3-1, . . . , 3-N is shown as a single band antenna arrangement. However this is not limiting of the invention and the active transceiver arrangement 3-1, . . . , 3-N could as well be a multiband antenna arrangement.

The antenna arrangement 4-1, . . . , 4-N comprises an antenna element 70-1, . . . , 70-N. The antenna element 70-1, . . . , 70-N is adapted to radiate the first transmit signal 2000-T1, . . . , 2000-TN and the second transmit signal 2002-T1, . . . , 2002-TN and to receive the first receive signal 2000-R1, . . . , 2000-RN and the second receive signal 2002-R1, . . . , 2002-RN. The antenna element 70-1, . . . , 70-N is well-known and will not be described in detail in the present disclosure.

Returning to the sampling element 15-1, . . . , 15-N, the sampling element 15-1, . . . , 15-N is adapted to extract a transmit sampling signal 2000-T1S, . . . , 2000-TNS out of the transmit signal 2000-T1, 2000-TN. The sampling element 15-1, . . . , 15-N is adapted to extract a receive sampling signal 2000-R1S, . . . , 2000-RNS out of the receive signal 2000-R1, 2000-RN. T The sampling element 15-1, . . . , 15-N is further adapted to reinject a compensation signal 2000-C1, . . . , 2000-CN into the transmit signal 2000-T1, 2000-TN and/or the receive signal 2000-R1, 2000-RN.

The sampling element 15-1, . . . , 15-N of FIG. 1 is a summing junction 31 followed by a DC blocking capacitor 32-1, . . . , 32-N, a resistance 33-1, . . . , 33-N and the compensation block 40-1, . . . , 40-N. As will be described later, the summing junction 31 may be replaced by one or more couplers.

The compensation block 40-1, . . . , 40-N comprises a varactor diode 41-1, . . . , 41-N controlled by a DC control voltage 42-1, . . . , 42-N.

The DC control voltage 42-1, . . . , 42-N is adapted to control the amount of phase-shift applied to correct for filter-related errors or other phase errors. The DC control voltage 42-1, . . . , 42-N is supplied through an RF choke 43-1, . . . , 43-N. The RF choke 43-1, . . . , 43-N prevents radio signals at radio frequency from leaking back into the DC control voltage 42-1, . . . , 42-N.

The DC control voltage 42-1, . . . , 42-N is adapted to provide a DC voltage, which reverse-biases the varactor diode 41-1, . . . , 41-N. This DC control voltage 42-1, . . . , 42-N in turn increases or decreases the varactor diode's capacitance, depending upon the applied DC voltage level.

The DC blocking capacitor 32-1, . . . , 32-N is adapted to prevent the DC bias voltage from the DC control voltage 42-1, . . . , 42-N from shorting in any filtering or other components attached to the corporate feed network 12. This may include elements located down the RF coax feeder cable 5 and within the base transceiver station 11.

The aim of the resistance 33-1, . . . , 33-N is to reduce the amount of radio signal hitting the varactor diode 41-1, . . . , 41-N. It should be understood that only small amounts of correction are required and hence only a portion of the RF signal needs to be processed by the compensation block 40-1, . . . , 40-N. For example, the degree of phase compensation required could be around 10 degree. A portion of the RF signal could represent a percentage of <50% of the RF signal.

Figure 2:
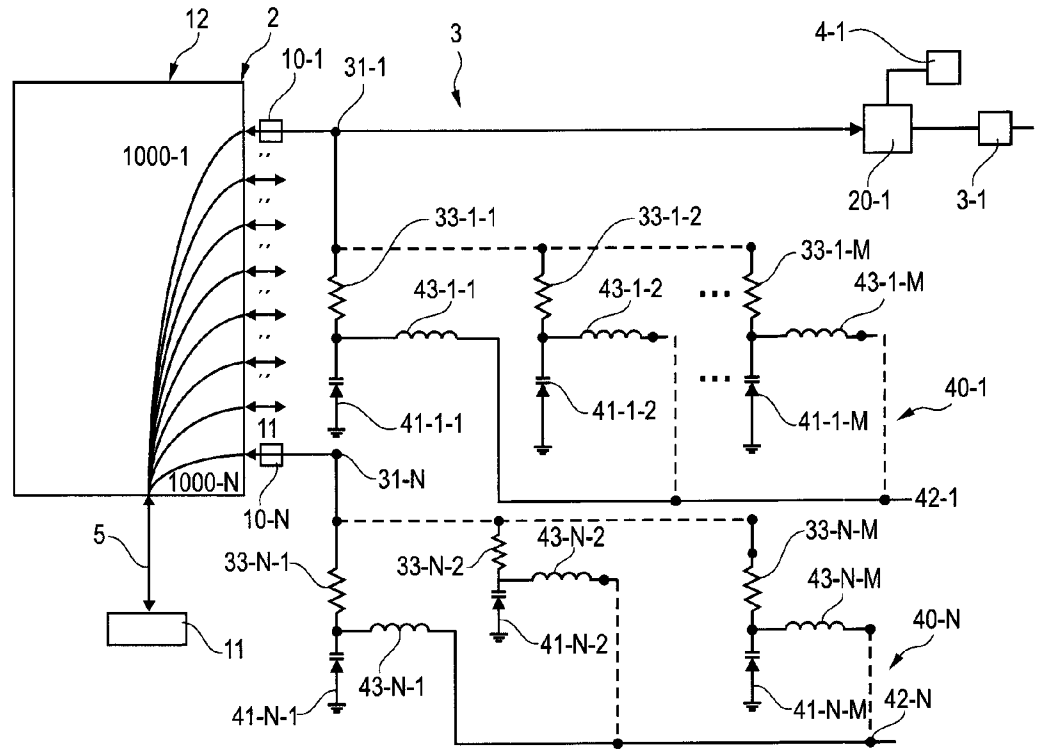
FIG. 2 shows a combined single band active and broadband passive antenna system comprising an active antenna system according to yet another aspect of the disclosure.

FIG. 2 shows an alternative aspect of the combined single band active and broadband passive antenna system 1. Those elements of FIG. 2 which are identical to the elements of FIG. 1 have identical reference numerals.

The alternative aspect of FIG. 2 differs from FIG. 1 in that the compensation block 40-1, . . . , 40-N comprises an array of M resistances 33-1-1, 33-1-2, . . . , 33-1-M, . . . , 33-N-1, 33-N-2, . . . , 33-N-M coupled to an array of M varactor diodes 41-1-1, 41-1-2, . . . , 41-1-M, . . . , 41-N-1, 41-N-2, . . . , 41-N-M arranged in parallel instead of the single varactor diode 41-1, . . . , 41-N of FIG. 1. Each varactor diode 41-1-1, 41-1-2 . . . , 41-1-M, . . . , 41-N-1, 41-N-2 . . . , 41-N-M is controlled by a DC control voltage 42-1, . . . , 42-N whereby the control voltage for each varactor diode 41-1-1, 41-1-2, . . . , 41-1-M, . . . , 41-N-1, 41-N-2, . . . , 41-N-M is supplied through an array of M RF chokes 43-1-1, 43-1-2, . . . , 43-1-M, . . . , 43-N-1, 43-N-2, . . . , 43-N-M.

The advantage of the array of varactor diodes 41-1-1, 41-1-2 . . . , 41-1-M, . . . , 41-N-1, . . . , 41-N-M arranged in parallel is that it allows each varactor diode 41-1-1, 41-1-2 . . . , 41-1-M, . . . , 41-N-1, 41-N-2, . . . , 41-N-M of the array to contribute only to a small amount of phase-shift and hence allows the resistances 33-1-1, 33-1-2, . . . , 33-1-M, . . . , 33-N-1, 33-N-2, . . . , 33-N-M to each to be increased in value, thereby, in turn, reducing the RF signal voltage across each varactor diode 41-1-1, 41-1-2 . . . , 41-1-M, . . . , 41-N-1, 41-N-2 . . . , 41-N-M. This allows each varactor diode 41-1-1, 41-1-2 . . . , 41-1-M, . . . , 41-N-1, 41-N-2, . . . , 41-N-M to work in a linear domain, thereby advantageously reducing the intermodulation products generated by each varactor diode.

Figure 3:
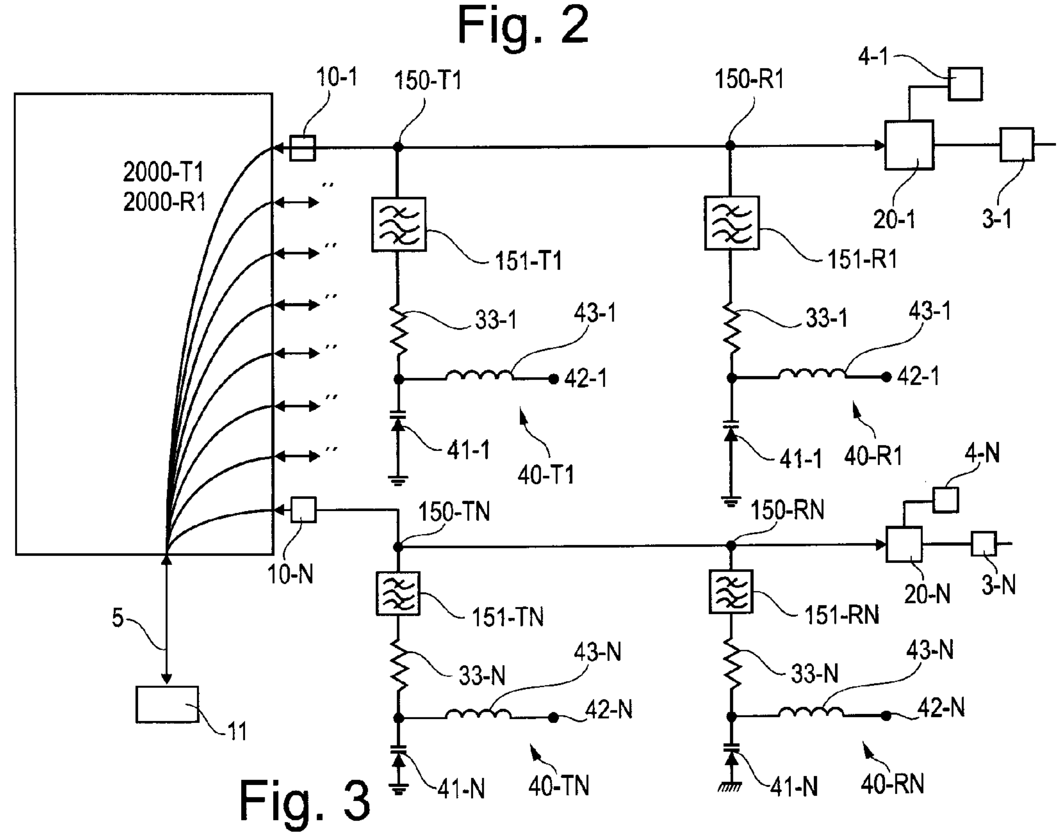
FIG. 3 shows another combined single band active and broadband passive antenna system comprising an active antenna system according to yet another aspect of the disclosure.

FIG. 3 shows an alternative aspect of the combined single band active and broadband passive antenna system 1. The alternative aspect of FIG. 3 differs from FIG. 1 in that there is a first sampling element 150-T1, . . . , 150-TN followed by a first filter 151-T1, . . . , 151-TN coupled to a first compensation block 40-T1, . . . , 40-TN and a second sampling element 150-R1, . . . , 150-RN followed by a second filter 151-R1, . . . , 151-RN coupled to a second compensation block 40-R1, . . . , 40-RN.

Those elements of FIG. 3 which are identical to the elements of FIG. 1 have identical reference numerals.

The first sampling element 150-T1, . . . , 150-TN with the first filter 151-T1, . . . , 151-TN are adapted to sample the transmit signal 2000-T1, 2000-TN only. The second sampling element 150-R1, . . . , 150-RN with the second filter 151-R1, . . . , 151-R are adapted to sample the receive signal 2000-R1, 2000-RN.

The first filter 151-T1, . . . , 151-TN is a bandpass filter passing frequencies in the first transmit band TB1. The second filter 151-R1, . . . , 151-R is a bandpass filter passing frequencies in the first receive band RB1.

The first compensation block 40-T1, . . . , 40-TN and the second compensation block 40-R1, . . . , 40-RN of FIG. 2 are identical to the compensation block 40-1 of FIG. 1

Advantageously, two compensation blocks allows different, separate compensation for the transmit signal 2000-T1, . . . , 2000-TN and the receive signal 2000-R1, . . . , 2000-RN. It should be understood that the delay errors and phase errors are quite likely to be different for the transmit signals and the receive signals in the different frequency bands TB1, RB1. These different errors are likely to require separate compensation.

It should be noted that the first and second bandpass filters 151-T1, . . . , 151-TN 151-R1, . . . , 151-RN only need to pass a relatively low power level, even in the case of the transmit signal 2000-T1, . . . , 2000-TN. The first bandpass filter and the second bandpass filters 151-T1, . . . , 151-TN 151-R1, . . . , 151-RN can therefore be manufactured from a low-power technology, keeping the costs to a minimum.

Figure 4:
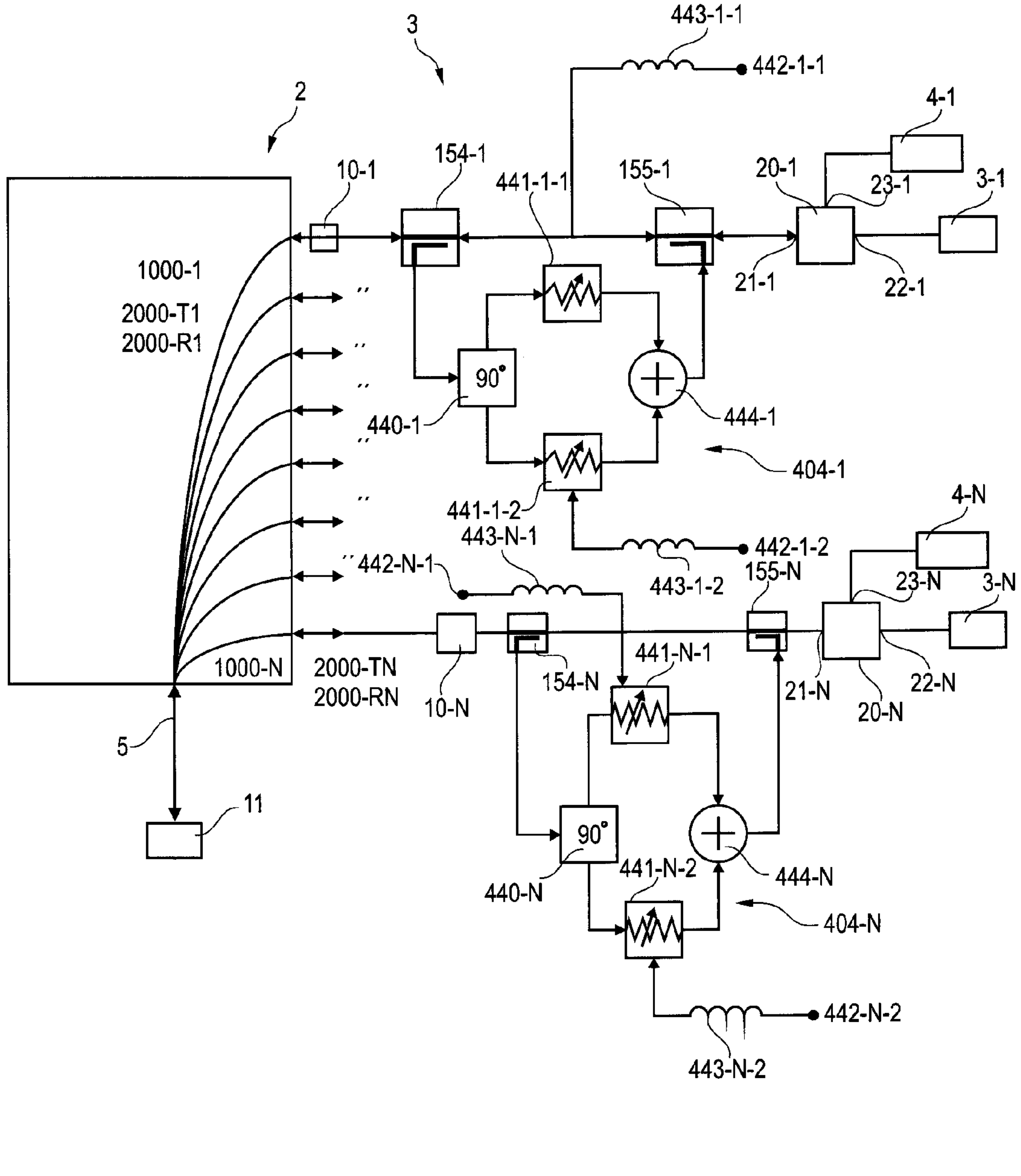
FIG. 4 shows another combined single band active and broadband passive antenna system comprising an active antenna system according to another aspect of the disclosure.

FIG. 4 shows an alternative aspect of the combined single band active and broadband passive antenna system 1. The alternative aspect of FIG. 4 differs from FIG. 1 in that the sampling element 15-1, . . . , 15-N is replaced by a sampling coupler 154-1, . . . , 154-N and an injection coupler 155-1, . . . 155-N. The alternative aspect of FIG. 4 also differs from FIG. 1 in that the compensation block 40-1, . . . , 40-N is replaced by a vector modulator block 404-1, . . . , 404-N.

The sampling coupler 154-1, . . . , 154-N is adapted to extract a portion of the transmit signal 2000-T1, . . . , 2000-TN to be fed to the vector modulator block 404-1, . . . , 404-N. The injection coupler 155-1, . . . 155-N is adapted to reinject a transmit compensation signal 2000-TC1, . . . , 2000-TCN into the transmit signal 2000-T1, . . . , 2000-TN.

The vector modulator block 404-1, . . . , 404-N includes a quadrature splitter 440-1, . . . , 440-N, two pin diodes 441-1-1, 441-1-2, . . . 441-N-1, . . . , 441-N-2, and a phase combiner 444-1, . . . , 444-N. Two respective DC control voltages 442-1-1, 442-1-2, . . . 442-N-1, . . . , 442-N-2 supply a control voltage to the respective pin diodes 441-1-1, 441-1-2, . . . 441-N-1, . . . , 441-N-2 through an RF choke 443-1-1, 443-1-2, . . . 443-N-1, . . . , 443-N-2.

Vector modulation allows for both amplitude control and phase control. The concept of vector modulation is well known in the art and will not be described in detail in the present disclosure.

It should be noted that PIN diodes are optionally available in a 'long carrier lifetime' form and this form generates very low amounts of intermodulation distortion.

It should also be understood that only control of the transmit signal is shown on FIG. 4. However, a similar arrangement may be used for correcting the receive signal in the receive directions. In the receive direction, the directivity of these couplers should ensure that any parasitic alteration of the phase of the receive signals is minimal.

Figure 5:
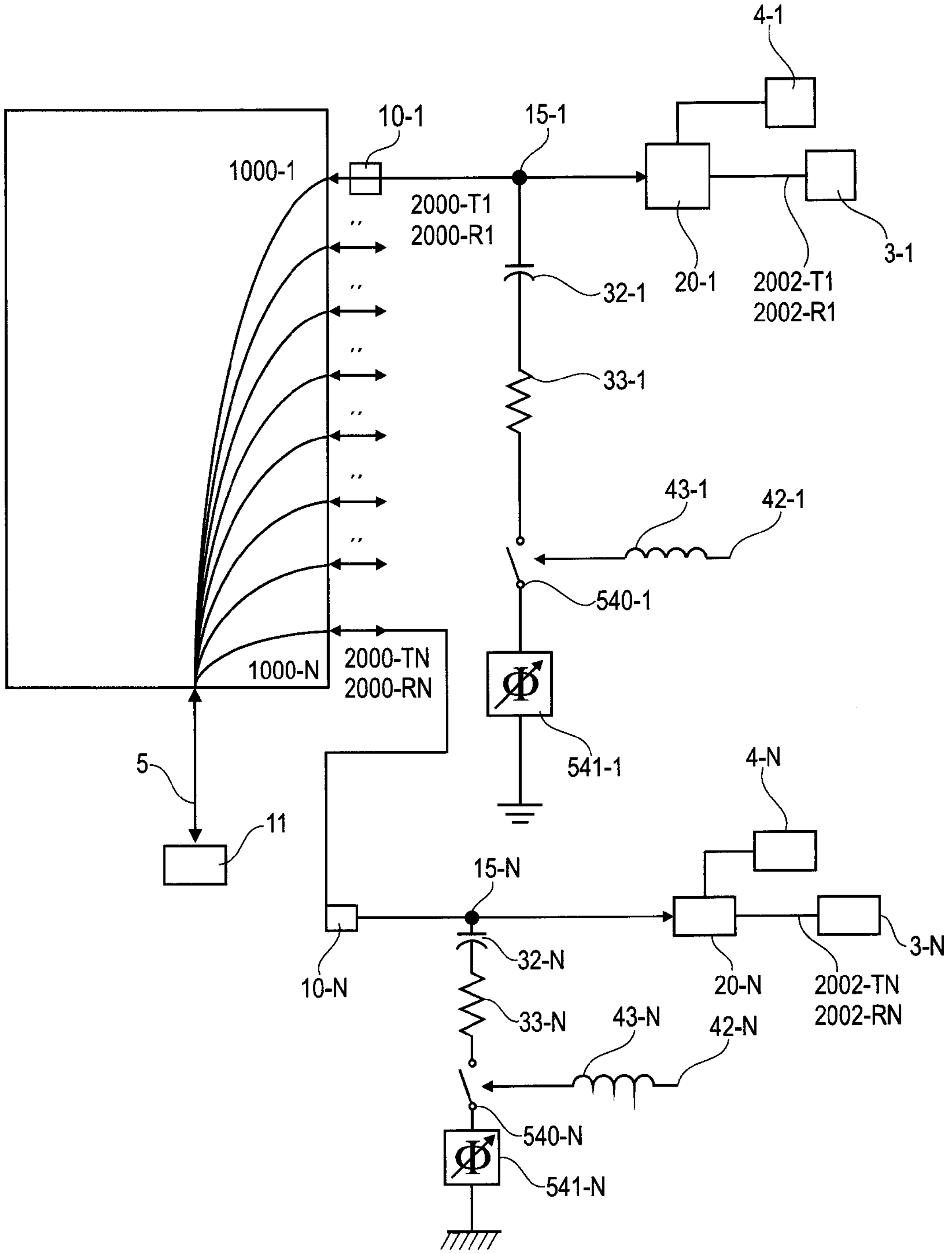
FIG. 5 shows a combined single band active and broadband passive antenna system comprising an active antenna system according to yet another aspect of the disclosure.

FIG. 5 shows an alternative aspect of combined single band active and broadband passive antenna system 1. The alternative aspect of FIG. 5 differs from FIG. 1 in that the varactor diode 41-1, . . . , 41-N of FIG. 1 is replaced by a PIN diode 540-1, . . . , 540-N coupled to a fixed transmission line 541-1, . . . , 541-N. The pin diode 540-1, . . . , 540-N is controlled by the DC control voltage 42-1, . . . , 42-N supplied through the RF choke 43-1, . . . , 43-N. The pin diode 540-1, . . . , 540-N is used as a switch adapted for switching in small amounts of fixed phase shift or fixed delay using the transmission line 541-1, . . . , 541-N.

This allows adding in a known quantity of the original signal 2000-T1, . . . , 2000-TN at a known phase, thereby generating a known phase-shift.

The person skilled in the art will recognise that the ground connection at the bottom of the phase-shift/transmission line 541-1, . . . , 541-N could equally well be an open circuit, since both the ground connection and the open circuit will provide a high degree of RF reflection in the right circumstances, such as a total path length of an appropriate number of quarter wavelengths.

Figure 6:
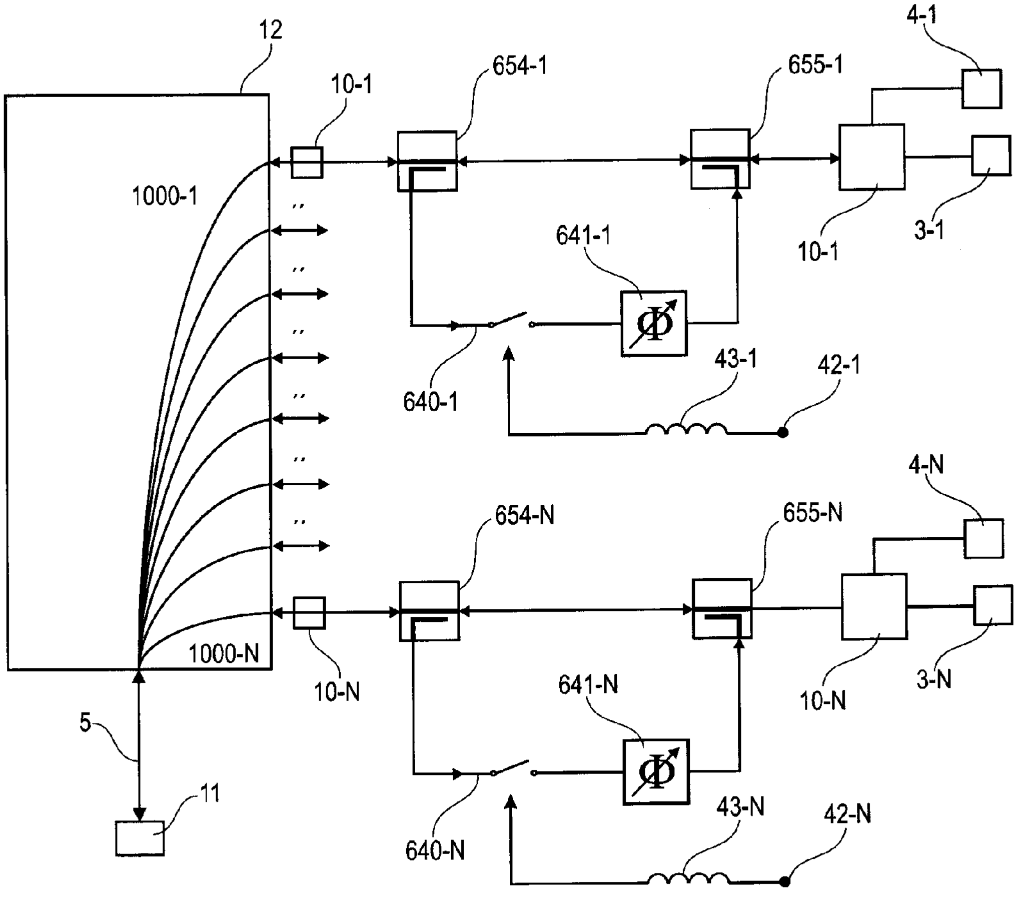
FIG. 6 shows yet another combined single band active and broadband passive antenna system comprising an active antenna system according to yet another aspect of the disclosure.

FIG. 6 shows an alternative aspect of the combined single band active and broadband passive antenna system 1. The alternative aspect of FIG. 6 differs from FIG. 1 in that the sampling element 15-1, . . . , 15-N is replaced by a sampling coupler 654-1, . . . , 654-N and an injection coupler 655-1, . . . 655-N. Further, the varactor diode 41-1, . . . , 41-N of FIG. 1 is replaced by a PIN diode 640-1, . . . , 640-N coupled to a fixed transmission line 641-1, . . . , 641-N. The pin diode 640-1, . . . , 640-N is control by the DC control voltage 42-1, . . . , 42-N supplied through the RF choke 43-1, . . . , 43-N. The pin diode 640-1, . . . , 640-N is used as a switch adapted for switching in small amounts of fixed phase shift or fixed delay using the transmission line 641-1, . . . , 641-N.

The sampling coupler 654-1, . . . , 654-N is adapted to extract a portion of the transmit signal 2000-T1, . . . , 2000-TN to be fed to the pin diode 640-1, . . . , 640-N. The injection coupler 655-1, . . . 655-N is adapted to reinject a transmit compensation signal 2000-TC1, . . . , 2000-TCN into the transmit signal 2000-T1, . . . , 2000-TN.

It should be noted that relatively low coupling factors, e.g. 10 or 20 dB may well be sufficient in many applications, since the phase-shifts required are small.

It should be noted that only a single phase-shift/line-length 641-1, . . . , 641-N is shown here, however the switch/phase-shift components could be repeated many times (in parallel, for example), with differing phase/line-lengths chosen for each. Only one switch 640-1, . . . , 640-N would be closed at any one point in time, corresponding to the approximate value of phase-shift required.

While various embodiments of the present invention have been described above, it should be understood that they have been presented by way of example, and not limitation. It will be apparent to persons skilled in the relevant arts that various changes in form and detail can be made therein without departing from the scope of the invention. In addition to using hardware (e.g., within or coupled to a central processing unit ("CPU"), micro processor, micro controller, digital signal processor, processor core, system on chip ("SOC") or any other device), implementations may also be embodied in software (e.g. computer readable code, program code, and/or instructions disposed in any form, such as source, object or machine language) disposed for example in a computer useable (e.g. readable) medium configured to store the software. Such software can enable, for example, the function fabrication modelling, simulation, description and/or testing of the apparatus and methods describe herein. For example, this can be accomplished through the use of general program languages (e.g., C, C++), hardware description languages (HDL) including Verilog HDL, VHDL, or other available programs. Such software can be disposed in any known computer useable medium such as semiconductor, magnetic disc, or optical disc (e.g., CD-ROM, DVD-ROM, etc.). The software can also be disposed as a computer data signal embodied in a computer useable (e.g. readable) transmission medium (e.g., carrier wave or any other medium including digital, optical, analogue-based medium). Embodiments of the present invention may include methods of providing the apparatus described herein by providing software describing the apparatus and subsequently transmitting the software as a computer data signal over a communication network including the internet and intranets.

It is understood that the apparatus and method describe herein may be included in a semiconductor intellectual property core, such as a micro processor core (e.g., embodied in HDL) and transformed to hardware in the production of integrated circuits. Additionally, the apparatus and methods described herein may be embodied as a combination of hardware and software. Thus, the present invention should not be limited by any of the above-described exemplary embodiments, but should be defined only in accordance with the following claims and their equivalents.

The invention claimed is:

1. An active antenna system, comprising:

an antenna element arrangement with a plurality of antenna elements;

a first coupling block adapted to sample a portion of a first telecommunication signal in a first frequency band, the first telecommunication signal being transceived by a base transceiver station a first compensation block coupled to the first coupling block, wherein the first coupling block comprises a first filter coupled to the first compensation block, wherein the first filter is adapted for filtering transmit signals of the first telecommunication signal, the first compensation block being adapted to apply at least a first phase compensation to the portion of the first telecommunication signal and thereby obtaining a first compensation signal, the first coupling block being further adapted to combine the first telecommunication signal and the first compensation signal into a compensated first telecommunications signal for feeding into one of the plurality of antenna elements;

a bandpass filter coupled to a passive feeding network and adapted to filter the first telecommunication signals in said first frequency band;

an active transceiver arrangement adapted to transceive a second telecommunication signal in a second frequency band;

a combining element for combining the compensated first telecommunications signal and said second telecommunication signal into a combined telecommunications signal for feeding into one antenna element of the antenna element arrangement.

2. The system according to claim 1, wherein the sampled portion of the first telecommunication signal represents between 5 and 50% of the first telecommunication signal.

3. The system according to claim 1, wherein the first coupling block comprises a summing junction, and wherein a first resistance is coupled between the summing junction and the compensation block.

4. The system according to claim 1, wherein the first compensation block comprises at least one varactor diode controlled by a control voltage supplied through an RF choke.

5. The system according to claim 1, wherein the first compensation block comprises an array of varactor diodes, wherein at least one varactor diode of the array of varactor diodes is controlled by a control voltage supplied through a corresponding RF choke, with a value of the control voltage being identical for each ones of the varactor diodes.

6. The system according to claim 1, wherein the first compensation block comprises a vector modulator adapted to apply at least one of a phase compensation and an amplitude compensation to the portion of the first telecommunication signal.

7. The system according to claim 1, wherein the first compensation block comprises at least one switch coupled to at least one fixed transmission line length.

8. The system according to claim 7, wherein the at least one switch comprises a pin diode controlled by a control voltage supplied through a RF choke.

9. The system according to claim 1, further comprising a splitting element adapted to split a combined telecommunications signal from the antenna arrangement into first receive signals of the first telecommunication signal in a first frequency band and second receive signals of the second telecommunication signal in a second frequency band.

10. The active antenna system according to claim 1, further comprising:

a second coupling block with a second filter coupled to a second compensation block, wherein the second filter is adapted for filtering receive signals of the first telecommunication signal, the second compensation block being adapted to apply at least a second phase compensation to the sampled portion of the first telecommunications signal and thereby obtain a second compensation signal;

the second coupling block being further adapted to combine the first telecommunication signal and the second compensation signal into a compensated second telecommunication signal for feeding to the base transceiver station.

11. A computer program product comprising a non-transitory computer-usable medium having control logic stored therein for causing a computer to manufacture an active antenna system comprising:

an antenna element arrangement with a plurality of antenna elements;

a first coupling block adapted to sample a portion of a first telecommunication signals in a first frequency band;

a first compensation block coupled to the coupling block, the coupling block comprises a first filter coupled to the compensation block, wherein the first filter is adapted for filtering transmit signals of the first telecommunication signal the first compensation block being adapted to apply at least a phase compensation to the portion of the first telecommunication signal thereby obtaining a first compensation signal:

the first coupling block being further adapted to combine the first telecommunication signal and the first compensation signal into a compensated first telecommunications signal to be fed into the antenna arrangement a bandpass filter coupled to a passive feeding network and adapted to filter the first telecommunication signals in said first frequency band;

an active transceiver arrangement adapted to transceive a second telecommunication signal in a second frequency band;

a combining element for combining the compensated first telecommunications signal and said second telecommunication signal into a combined telecommunications signal for feeding into one antenna element of the antenna element arrangement.

* * * * *